United States Patent
Flaherty et al.

(10) Patent No.: US 7,580,979 B2
(45) Date of Patent: Aug. 25, 2009

(54) MESSAGE ORDERING IN A MESSAGING SYSTEM

(75) Inventors: Dermot Flaherty, Southampton (GB); Stephen J Todd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 741 days.

(21) Appl. No.: 10/319,268

(22) Filed: Dec. 13, 2002

(65) Prior Publication Data

US 2003/0115276 A1    Jun. 19, 2003

(30) Foreign Application Priority Data

Dec. 19, 2001    (GB)    ................................ 0130399.9

(51) Int. Cl.
*G06F 15/16*    (2006.01)
(52) U.S. Cl. ........................ 709/206; 709/204; 709/207
(58) Field of Classification Search ................. 709/204, 709/206, 207
See application file for complete search history.

(56) References Cited

U.S. PATENT DOCUMENTS

| | | | | |
|---|---|---|---|---|
| 5,452,445 A | * | 9/1995 | Hallmark et al. ................ | 707/2 |
| 5,778,179 A | * | 7/1998 | Kanai et al. .................. | 709/203 |
| 6,012,094 A | * | 1/2000 | Leymann et al. ............. | 709/230 |
| 6,157,927 A | * | 12/2000 | Schaefer et al. .......... | 707/103 R |
| 6,338,146 B1 | * | 1/2002 | Johnson et al. ................ | 714/4 |
| 6,351,753 B1 | * | 2/2002 | Jagadish et al. ............. | 707/203 |
| 6,397,352 B1 | * | 5/2002 | Chandrasekaran et al. ..... | 714/16 |
| 6,401,136 B1 | * | 6/2002 | Britton et al. ............... | 719/314 |
| 6,529,932 B1 | * | 3/2003 | Dadiomov et al. .......... | 718/101 |
| 6,560,601 B1 | * | 5/2003 | Bjornerstedt ................... | 707/8 |
| 6,684,223 B1 | * | 1/2004 | Ganesh et al. .............. | 707/200 |
| 6,701,330 B1 | * | 3/2004 | Cooper et al. ............... | 707/202 |
| 6,980,988 B1 | * | 12/2005 | Demers et al. .................. | 707/8 |
| 2006/0136887 A1 | * | 6/2006 | Kaczynski et al. .......... | 717/151 |

* cited by examiner

*Primary Examiner*—Nathan J Flynn
*Assistant Examiner*—Mohamed Wasel
(74) *Attorney, Agent, or Firm*—Coats & Bennett, P.L.L.C.

(57) ABSTRACT

A messaging handling system implements the well-known Two-Phase Commit protocol (comprising prepare and commit operations) to store messages related to transactions in a repository, but enforces message ordering. The commit operation is divided into two phases: a commit phase and a release phase. Prepare requests are implemented conventionally. Commit requests are implemented by immediately executing the commit phase of the operation, but delaying release of the message for reading from the repository until all prepare requests received prior to an instant request have released. In this manner, message ordering is preserved, while allowing use of conventional two-phase commit protocol processing.

7 Claims, 3 Drawing Sheets

| example step (system step) | operation UOW | message A state | message B state |
|---|---|---|---|
| 310 (A) | PUT A | PUT | |
| 320 (A) | PUT B | PUT | PUT |
| 330 (B) | PREPARE A | PREPARED (1) | PUT |
| 340 (B) | PREPARE B | PREPARED (1) | PREPARED (2) |
| 350 (C) | COMMIT B | PREPARED (1) | COMMITTED (2) |
| 360 | READ | | no message read, none RELEASED |
| 370a (C) | COMMIT A | COMMITTED(1) | COMMITTED(2) |
| 370b (D, type 1) | | RELEASED(1) | COMMITTED(2) |
| 370c (D, type 2) | | RELEASED(1) | RELEASED(2) |
| 380 | READ | message A read | RELEASED(2) |
| 390 | READ | | message B read |

| example step (system step) | operation UOW | message A state | message B state |
|---|---|---|---|
| 310 (A) | PUT A | PUT | |
| 320 (A) | PUT B | PUT | PUT |
| 330 (B) | PREPARE A | PREPARED (1) | PUT |
| 340 (B) | PREPARE B | PREPARED (1) | PREPARED (2) |
| 350 (C) | COMMIT B | PREPARED (1) | COMMITTED (2) |
| 360 | READ | | *no message read, none RELEASED* |
| 370a (C) 370b (D, type 1) 370c (D, type 2) | COMMIT A | COMMITTED(1) RELEASED(1) RELEASED(1) | COMMITTED(2) COMMITTED(2) RELEASED(2) |
| 380 | READ | *message A read* | RELEASED(2) |
| 390 | READ | | *message B read* |

FIG. 3

MESSAGE ORDERING IN A MESSAGING SYSTEM

FIELD OF THE INVENTION

This invention relates to messaging systems, and particularly to messaging systems where message ordering must be related to transactional boundaries. Such a messaging system, for example, may be used to capture database changes as they occur within a transaction.

BACKGROUND OF THE INVENTION

In the field of this invention it is known that there are various database replication systems that operate over messaging systems.

However, many of these operate by a separate phase where the database log is scraped to extract relevant data after transactions are complete. This approach has various disadvantages:
- It has increased latency
- It requires a more complete log record to be kept than needed for most database processing, which slows down database log writing
- The scraping phase must recreate database transaction boundaries and ordering from information in the log, which is time consuming Other systems use 'during transaction' capture, but have small windows of error where database changes may be recorded in the wrong order. This results in errors in the replica.

A need therefore exists for a scheme for message handling in a messaging system wherein the abovementioned disadvantage(s) may be alleviated.

STATEMENT OF THE INVENTION

In accordance with a first aspect of the present invention there is provided a method for message handling in a messaging system as claimed in claim 1.

In accordance with a second aspect of the present invention there is provided a message handling system as claimed in claim 7.

BRIEF DESCRIPTION OF THE DRAWINGS

Two schemes for message handling in a messaging system incorporating the present invention will now be described, by way of example only, with reference to the accompanying drawings, in which:

FIG. 3 shows a table depicting the sequence of steps involved in a first preferred embodiment of the invention.

DESCRIPTION OF PREFERRED EMBODIMENTS

Figure 1:
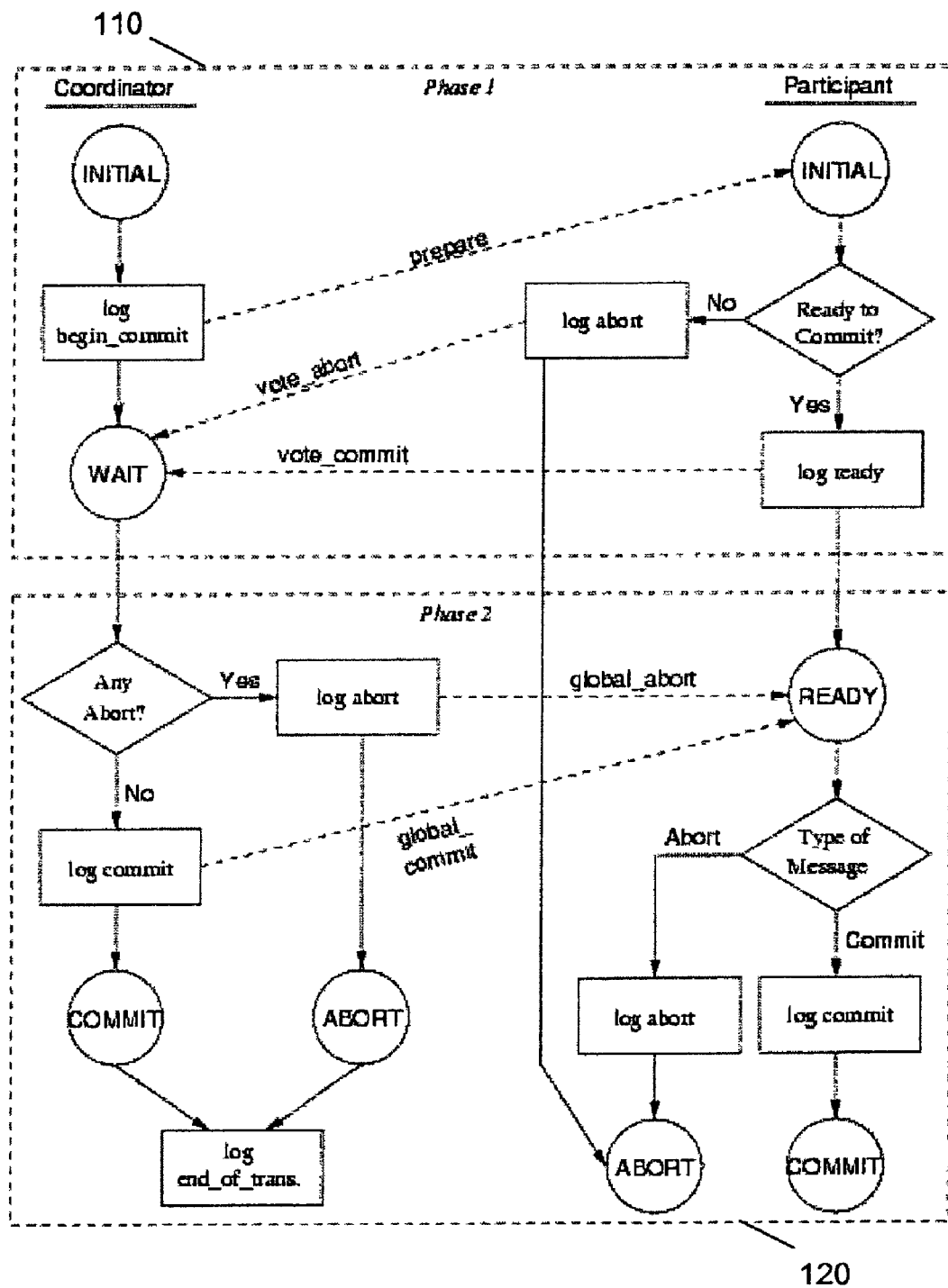
FIG. 1 shows a block-schematic diagram illustrating the well-known Two-Phase Commit protocol.

As shown in FIG. 1, the well-known Two-Phase Commit protocol is a simple and elegant atomic commit protocol (ACP) with two types of processes: a single coordinator that decides whether to reach a global commit or abort decision, and the participants that execute the transaction's resource accesses and vote whether to commit or abort. The commit decision is made according to the following 'global commit rule':
- if even one participant votes to abort the transaction, the coordinator has to reach a global abort decision; and
- if all participants vote to commit the transaction, the coordinator will generally reach a global commit decision.

Operation of the Two-Phase Commit protocol is illustrated (for simplicity, without consideration of failures or recovery) in FIG. 1. As depicted in this figure, circles represent states, solid lines represent state changes, dashed lines represent requests/messages (labeled with the request/message types), and rectangles represent logging actions.

As shown in FIG. 1, Two-Phase Commit has two phases 110 and 120.

In the first phase (110), a coordinator process is started (usually at the site where the transaction is initialized), writes a begin commit record in its log, sends a 'prepare' request to the participants, and enters the wait state.

When a participant receives a 'prepare' request, it checks if it can commit the transaction. If it can, the participant writes a ready record in its log, sends a 'vote_commit' response to the coordinator, and enters the ready state. Otherwise, the participant decides to unilaterally abort the transaction (it writes an abort record in the log and sends a 'vote_abort' message to the coordinator; it then enters the abort state and can forget about the transaction).

In the second phase (120), after the coordinator has received votes from all participants it decides whether to commit or abort according to the global commit rule, and writes this decision in the log. If the decision is to commit, it sends a 'global_commit' message to all sites. Otherwise, it sends a 'global_abort' message to all sites that voted to commit. Finally, it writes an end of transaction record in its log. The participants finish the transaction according to the decision and write the result in their logs.

When a queuing system is used to capture changes within another resource manager such as a database, in particular where the changes are captured as part of the transaction generating the change, database changes must be captured in the correct order; and the change order must be represented in the messages on the system queue. In such a system, although it is not essential, it is highly desirable, that the change order is represented directly by the order of messages on the queue (it is essential that either (1) the change order is represented by the order of messages on the queue, or (2) that the messages are change-order-stamped in some way with the change order. Database locking will ensure that change order is the same as, or equivalent to, prepare order. However, (2) is undesirable, as the change order is not known when the messages are PUT (that is, when they are sent by placing them in an outbound queue). The messages would need to be updated as part of the PREPARE phase. Also, even though the change-order-stamp would permit the message reader to reconstruct the correct order, the message reader would not know how long it might be necessary to wait for 'out of order' messages). An example of such a system is a database application using user defined fields (UDFs) and triggers to generate application specific change messages into a queueing system.

Figure 2:
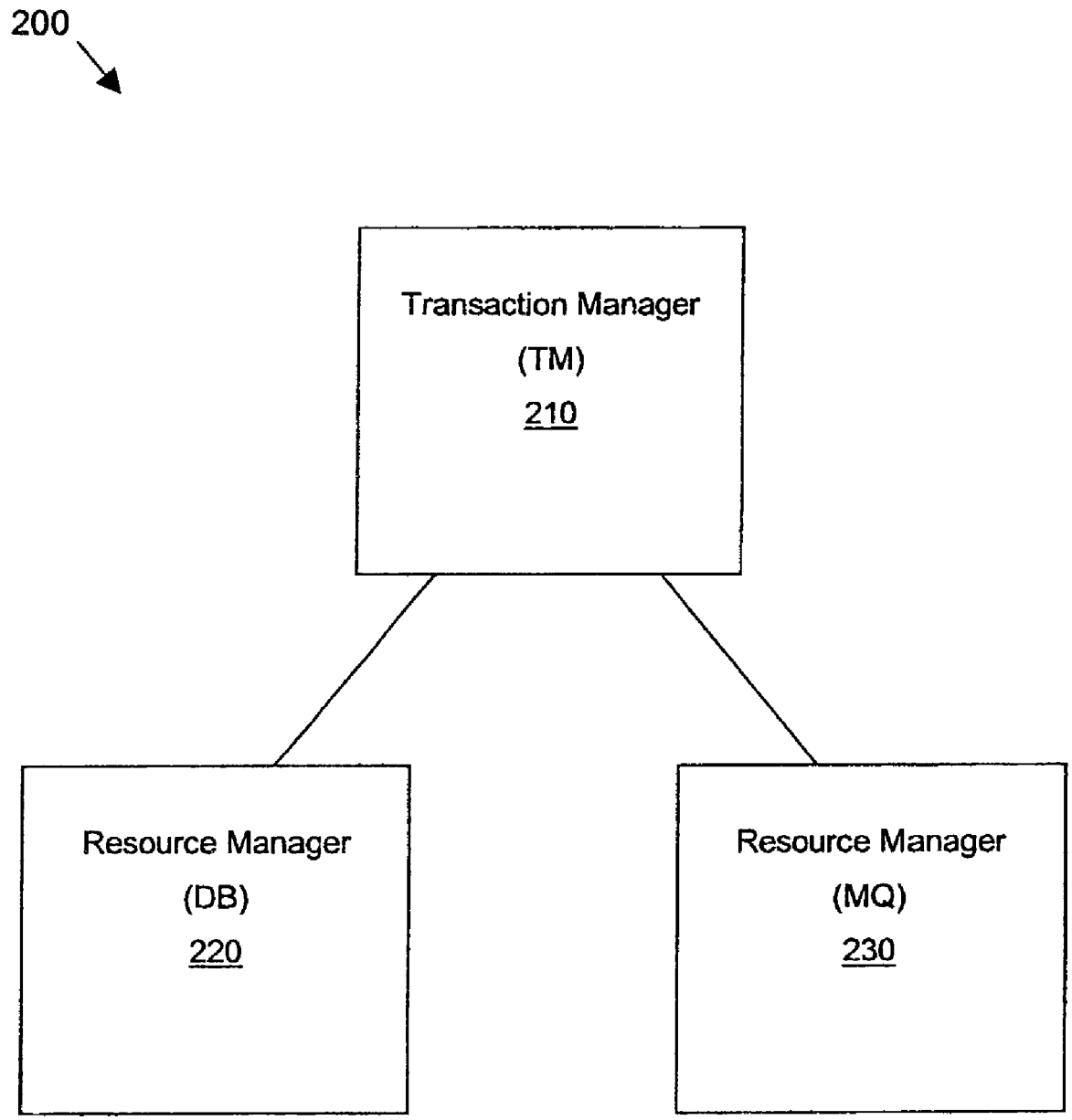
FIG. 2 shows a block-schematic diagram illustrating a messaging system having a transaction manager and two resource managers in which the present invention may be used.

Referring now to FIG. 2, such a system 200 consists of a transaction manager (TM) or resource coordinator 210, and at least two resource managers 220 and 230. One resource manager (such as a database manager, DB) 220 will be having changes applied by the application transactions. The other resource manager (for example a message queueing system, MQ) 230 will be used to capture the changes. It will be understood that in practice only a filtered set of changes is captured, and that this may be under application control or under control of an associated sub-system (such as a change exit replication system). The transaction manager (TM) 210 uses standard two phase commit protocols (prepare and commit/abort as described above in relation to FIG. 1) to coordinate the resource managers (DB and MQ) 220 and 230. Typically, many transactions will be running on different threads, and the transactions may be using multiple processors with various levels of coupling.

It will be understood that in practice the transaction manager (TM) 210 may actually be part of either the resource manager (DB) 220 or the resource manager 230 (MQ). In some environments, the order in which the resource manager (DB) 220 or the resource manager (MQ) 230 are called for prepare and for commit is well determined. For example, in an IMS environment (IMS is a well-known "Information Management System" database of IBM Corporation) both the transaction manager and 210 and database manager 230 are provided by IMS, DB 220 will be called for commit before the other resource manager MQ 230. In a CICS transaction processing system environment (CICS is a well-known transaction processing system from IBM Corporation which includes transaction coordination), the components TM 210 and DB 220 are provided by the CICS system, and resource manager MQ 230 will be called for commit before DB 220. In other environments such as XA (which is the international standard for the interface between two phase commit transaction coordinators and resource managers) with external coordinator, or DTC (the known two-phase commit coordinator of Microsoft Corporation—now integrated as part of Microsoft's operating system and ".NET" infrastructure) the order of the commit call to MQ and DB is non-deterministic, and the calls may be in parallel. CICS and IMS are trademarks of IBM Corporation.

Database locking and semantics will assure appropriate synchronization within the database; these locks will be held from when made during application processing (before the prepare phase) through until DB commit.

It is highly undesirable to change the protocols or operation of either TM or DB. The present invention does not require such a change.

The present invention is based on implementation of prepare ordering in a messaging system.

In a system where queuing is used to capture changes during a transaction, and these messages are to be replayed to recreate part or all of the changed system, a first preferred embodiment of the present invention implements unit-of-work (UOW) prepare order message ordering on queued messages by deferring execution of commit requests until commit (or abort) requests for all UOWs with earlier prepare order are complete.

In order to implement prepare ordering in this way in a system employing a transaction manager (TM) and resource managers (DB and MQ) such as described above in relation to FIG. 2, the first preferred embodiment of the present invention implements message ordering based on:

a) the time at which MQ is called for prepare on the message's UOW, and b) within UOW, the time at which the message is put.

In this way, committed messages go through the following states:

(a) PUT
(b) PREPARED
(c) COMMITTED
(d) RELEASED by the following system steps:

A) The message is in the PUT state immediately it is put.

B) When the PREPARE call is issued to MQ, messages within the UOW are put in the PREPARED state, and assigned a position in a global ordering for the queue (requires short queue lock).

C) When the COMMIT all instruction is issued to MQ, the messages are put into COMMITTED state.

D) When a COMMITTED message reaches the head of the unreleased part of the globally ordered queue, it is put into RELEASE state.

Messages from a unit of work may be moved from COMMITTED to RELEASED state (as in unit-of-work UOWB in step 340 of the table of FIG. 3 described in more detail below):

either D type 1) by a COMMIT of its own unit of work (UOWB), or D type 2) by the COMMIT of an 'earlier' unit of work (UOWA say), where UOWA is prepared before UOWB, but committed after UOWB.

The table of FIG. 3 shows the sequence of example steps 310-390 (and corresponding system steps A-D described immediately above) for implementing such a scheme, in respect of two units of work (UOWA and UWOB) where message A is put in UOWA and message B is put in UOWB.

It will be understood that this implementation of COMMIT for a UOW is in two parts (the first part applying to messages within a particular UOW, and the second possibly also applying to messages in other UOWs as well) as follows:

part 1) for all messages in UOW, perform step (C) (COMMIT)

part 2) starting at earliest message in queue with state not RELEASED, move through messages in order while state is COMMITTED perform step (D) (RELEASE).

It will be understood that with a standard two-phase system as discussed above in relation to FIG. 1, the READ operation at example step 360 would incorrectly read message B.

Thus it will be appreciated that the procedure described above in accordance with the first preferred embodiment of the present invention is effectively three-phase commit (Prepare, Commit, Release). However, it is achieved using a standard two-phase TM protocol, as the final phase (Release) may be performed at Commit time. It may be that Release for one transaction is triggered by Commit of another.

It will be appreciated that implementation of ordering based on the order with which MQ commit was called can give wrong answers. Where DB commit is called before MQ commit, MQ commit calls may be arbitrarily deferred by TM. In that case, orderings of DB prepare, DB commit and MQ prepare will be related (not necessarily identical), but with no assured relationship to MQ commit ordering.

There may be cases where the prepare phases (and commit phases) of many UOWs overlap. Assuming correct DB locking, this can only occur where the UOW ordering is non-important.

It will be understood that the scheme of the first preferred embodiment of the present invention described above assures correct ordering and thus correct end results.

Thus it will be appreciated that in its first preferred embodiment the present invention employs a three-phase commit sequence (in which the 'standard' commit phase is split into two parts, commit and release) as follows:

1) The prepare phase (first phase) can be conventional.

2) The first part of the commit (second phase) is the part at which it is known that the message will be made available on the queue. It occurs as soon as commit is requested by the coordinator.

3) The second part of the commit (third phase overall) releases the committed messages from the transaction to be read by a viewer of the queue. It occurs when all transactions with a prepare phase BEFORE the prepare phase for the given transaction have completed their release (or abort) phase.

Thus release phase ordering for two transactions is the same as prepare phase ordering. If we have two transactions (1 and 2), we may see the following ordering of events:

[P1, P2, C2, C1, R1, R2] or preferably
[P1, P2, C2, CR1, R2]

(Px representing Prepare of transaction x, Cx representing Commit of transaction x, Rx representing release of transaction, and CRx representing a combination of commit and release of transaction x into a single phase).

Thus, in summary, it will be understood that in its first preferred embodiment the present invention provides, in a system where queuing is used to capture changes during a transaction, and these messages are to be replayed to recreate part or all of the changed system:
a) implementation of prepare order message ordering on queued messages
b) use of a three phase commit protocol: Prepare, Commit, Release
c) implementation of Release within the Commit phase (maybe of the same UOW or another UOW as appropriate) so that a standard two-phase coordinator may be used.

It will be appreciated that the first two phases (PREPARE and COMMIT) of a three phase transaction must be persisted (probably in the transaction log) to ensure correct recovery behaviour. However, the third phase (RELEASE) does not need to be persisted. The necessary information can be reconstituted by the resource manager on restart. Thus the three-phase commit protocol does not add additional I/O to the standard two-phase protocol, and is thus likely to be only a minimal performance impact.

In a second preferred embodiment the present invention employs a two-phase commit sequence. To ensure message ordering is correctly related to database changes, where commit requests come in a different order from prepare requests, execution of early commit requests for transactions prepared later are deferred until the commit (abort) requests for the transactions prepared later have been completed. Thus, for two transactions (1 and 2), we may see the following ordering of events:

[eg P1, P2, <C2 . . . , <C1>, . . . C2>]

(<Cx . . . representing the request for transaction x to commit, . . . Cx> representing the implementation of the commit, and <Cx> representing the case where the commit phase does not need to be deferred and is implemented as soon as requested).

Thus, in summary, it will be understood that in its second preferred embodiment the present invention provides, in a system where message queuing is used to capture changes during a transaction, and these messages are to be replayed to recreate part or all of the changed system:
a) implementation of UOW prepare order message ordering on queued messages;
b) implement this by deferring execution of commit requests until commit (or abort) requests for all UOWs with earlier prepare order are complete.

Thus, it will be appreciated that the first and second preferred embodiments of the present provide alternative solutions to the same problems as discussed above, and that whereas the first preferred embodiment has the advantage that queue manager commit operations are not unnecessarily held up (but depending on coordinator implementation this could also hold up database commits for the same transaction and reduce concurrency), the second preferred embodiment has the advantage that it is not necessary to add the 'committed but unreleased' phase for messages.

Thus it will be understood that the essential difference between the first and second preferred embodiments of the present invention is whether Commit phase is:
a) split into Commit and Release phases, with Commit implemented on request and Release implemented as soon as validly possible, or
b) kept as a single phase deferred as necessary after request, but implemented as soon as validly possible.

Clearly, (a) is preferable for performance, but more complex.

In a typical case, prepare ordering and commit ordering for transactions will be the same. In this case the first implementation will implement the release phase immediately following the commit phase [e.g., P1, P2, C1, R1, C2, R2] (or preferably will combine the two into a single commit/release phase [e.g., P1, P2, CR1, CR2]).

In this case the second preferred embodiment of the present invention will not need to defer commit, for example:

[P1, P2, <C1>, <C2>].

It will be appreciated that the methods described above for prepare ordering in a messaging system will typically be carried out in software running on a processor (not shown), and that the software may be provided as a computer program element carried on any suitable data carrier (also not shown) such as a magnetic or optical computer disc.

It will be understood that the implementations of prepare ordering in a messaging system described above provide the advantage of permitting appropriate message ordering in a transactional system, and in particular permits the correct implementation of a database replication system using coordinated message transport that is fed the changes during database transactions.

What is claimed is:

1. A method for message handling in a messaging system, comprising:
    receiving, from application programs, messages associated with transactions and placing the received messages in a repository for subsequent retrieval;
    receiving requests of prepare and commit for the transactions;
    processing each prepare request as it is received;
    processing each commit request as a two-phase operation comprising a commit phase and a release phase, wherein the commit phase is processed as soon as it is received and the release phase is processed only when the release phase processing is complete for all transactions for which a prepare request was received prior to the prepare request for the instant transaction.

2. The method of claim 1 wherein release phase processing comprises making messages associated with transactions available for reading from the repository.

3. The method of claim 1 wherein the messaging system is configured to capture database changes as they occur within a transaction.

4. The method of claim 3 wherein the messaging system comprises:
    a transaction manager;
    a first resource manager comprising a database; and
    a second resource manager comprising a messaging manager.

5. A message handling system, executed by a processor, comprising:
    a first resource manager comprising a database;

a second resource manager comprising a messaging manager; and a transaction manager communicatively coupled to the first and second resource managers, and configured to:

receive, from an application program, messages associated with transactions and to place the received messages in a repository for subsequent retrieval;

receive requests of prepare and commit for the transactions;

process each prepare request as it is received; process each commit request as a two-phase operation comprising a commit phase and a release phase, wherein the commit phase is processed as soon as it is received and the release phase is processed only when the release phase processing is complete for all transactions for which a prepare request was received prior to the prepare request for the instant transaction;

and retrieve, from the repository, the messages associated with a transaction in the sequence in which the messages were received from an application program.

6. The message handling system of claim 5 wherein the second resource manager is configured to capture database changes as they occur within a transaction.

7. A computer program product comprising computer program code recorded on a machine-readable storage medium, for controlling a data processing apparatus on which the program code executes to perform a method comprising the steps of:

receiving, from application programs, messages associated with transactions and placing the received messages in a repository for subsequent retrieval;

receiving requests of prepare and commit for the transactions;

processing each prepare request as it is received;

processing each commit request as a two-phase operation comprising a commit phase and a release phase, wherein the commit phase is processed as soon as it is received and the release phase is processed only when the release phase processing is complete for all transactions for which a prepare request was received prior to the prepare request for the instant transaction; and retrieving the messages from the repository in the sequence in which the messages were received from an application program.

* * * * *

UNITED STATES PATENT AND TRADEMARK OFFICE
CERTIFICATE OF CORRECTION

| | |
|---|---|
| PATENT NO. | : 7,580,979 B2 |
| APPLICATION NO. | : 10/319268 |
| DATED | : August 25, 2009 |
| INVENTOR(S) | : Flaherty et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1061 days.

Signed and Sealed this

Fourteenth Day of September, 2010

David J. Kappos
*Director of the United States Patent and Trademark Office*